United States Patent [19]

Benecke et al.

[11] Patent Number: 5,572,076

[45] Date of Patent: Nov. 5, 1996

[54] DIELECTRIC MICROMECHANICAL ELEMENT

[75] Inventors: Wolfgang Benecke; Bernhard Wagner; Günter Fuhr; Rolf Hagedorn; Roland Glaser; Jan Gimsa, all of Berlin, Germany

[73] Assignee: Fraunhofer Gesellschaft zur Foerderung der angewandten Forschung e.V., Muenchen, Germany

[21] Appl. No.: 730,914

[22] PCT Filed: Feb. 2, 1990

[86] PCT No.: PCT/DE90/00069

§ 371 Date: Oct. 21, 1991

§ 102(e) Date: Oct. 21, 1991

[87] PCT Pub. No.: WO90/09059

PCT Pub. Date: Aug. 9, 1990

[30] Foreign Application Priority Data

Feb. 2, 1989 [DE] Germany .................... 325 465-7

[51] Int. Cl.$^6$ ............................. H02K 57/00; H02N 1/06
[52] U.S. Cl. .................... 310/40 MM; 310/309
[58] Field of Search .................. 310/40 MM, 308, 310/12, 309; 318/135, 116

[56] References Cited

U.S. PATENT DOCUMENTS

| | | | |
|---|---|---|---|
| 2,907,884 | 10/1959 | Gale | 310/309 |
| 3,024,371 | 3/1962 | Lefkowitz | 310/309 UX |
| 3,696,258 | 10/1972 | Anderson | 310/10 |
| 3,729,925 | 5/1973 | Emerson | 318/116 |
| 3,924,146 | 12/1975 | George | 310/12 |
| 3,951,000 | 4/1976 | Ferris et al. | 310/309 UX |
| 4,477,859 | 10/1984 | Azuchi | 310/308 UX |
| 4,740,410 | 4/1988 | Muller | |
| 4,943,750 | 7/1990 | Howe | 310/309 |
| 5,001,381 | 3/1991 | Watanabe | 310/309 |

FOREIGN PATENT DOCUMENTS

| | | |
|---|---|---|
| 0233947 | 9/1987 | European Pat. Off. . |
| 136979 | 6/1988 | Japan . |
| 136982 | 6/1988 | Japan . |

OTHER PUBLICATIONS

Geo; Oct. 1988, (No Publisher's Name & Location).
W. Greiner; Theoretische Phsik; 1982; Deutsch; Thun und Frankfurt am Main; Germany.
Dielectrophoresis; H. A. Pohl; 1978; Cambridge Univ. Press; London, New York, Melbourne.
Landau & Lifschitz; Lehrbuch der Theoretische Physik; 1973; Akademie–Verlag, Berlin, Germany.

*Primary Examiner*—Clayton E. Laballe
*Attorney, Agent, or Firm*—Evenson, McKeown, Edwards & Lenahan, P.L.L.C.

[57] ABSTRACT

A dielectric micromechanical element the moveable component of which (hereinafter referred to as rotor) is an electrically homogeneous or inhomogeneous dielectric. The rotor is driven via one or more electric field vectors which are generated via electrode arrangements by switched voltages and/or by triggering the electrodes with phase-shifted voltages. On at least one side of the rotor and/or inside the rotor the electrodes form a linear or curved row of electrodes.

14 Claims, 2 Drawing Sheets

DIELECTRIC MICROMECHANICAL ELEMENT

FIELD OF THE INVENTION

The field of the present invention is microelectronics in which miniaturized mechanical elements may find use as drive, control switch and sensor systems. Utilization in chemistry and biotechnology is also possible.

BACKGROUND OF THE INVENTION

Miniaturized motors with dielectric rotors in an enveloping medium that can be set into rotation via several electrodes/GEO 10 (1988) 188, U.S. Pat. No. 4,740,410, are known as dieletric motors. Continuously or discontinuously rotating electric fields are employed for this purpose. Linear motions by dielectrics in electrical fields are described in textbooks under the heading electrophoresis, dielectrophoresis, respectively general ponderomotoric effects Greiner, Theor. Physik Bd. 3, Vlg. H. Deutsch, Thun & Frankfurt a.M., (1982), Pohl, Dielectrophoresis, Cambridge University Press, Cambridge-London-New York-Melbourne, (1978). Landau & Lifschitz, Bd. 1, Akademie-Vlg. Berlin, (1973). The pondermotoric effect is utilized to collect floating particles in air filter devices or to collect cells in biology. Devices of this type work with or more electrodes and a direct current and alternating current electric field. Use of linearly progressing field vectors is not known in this connection. Use of dielectric miniature elements, apart from dielectric motors, has not been described. Linearly progressing magnetic field vectors, on the other hand, are known in connection with electric induction effects and induction field motors Güldner, Electronica Bd. 238, Militärverlag der DDR, (1987). The disadvantage of dielectric micromechanic elements is the small force while, however, also having minimal currents. Their extreme possible miniaturization has not been recognized as an advantage (GEO 10 (1988), 188) until recent years.

An object of the present invention is to provide a cost-effective dielectric micromechanical element possessing universal possible application in microelectronics.

SUMMARY OF THE INVENTION

Another object of the present invention is the development of a dielectric micromechanical element with linear motion having constant and variable states of motion and being able to be universally utilized in microelectronics. The response time is intended to lie in the milli-second range and below.

In accordance with the present invention, these and other objects are met in that a dielectric homogeneously or inhomogenously constructed rotor supported in a known manner in an enveloping medium is moved with the aid of one or several linearly progressing electric fields. In accordance with the present invention, a linearly progressing field vector is generated for this purpose via electrodes disposed at at least two sides of the rotor, but not necessarily being in direct mechanical contact therewith. Dependent on the combination of the dielectrics of the rotor, its arrangement, the electric properties of the enveloping medium and the arrangement and pattern of the electrodes, which may also be arranged spacially in a matrix, the rotor follows the electric field or moves in the opposite direction. The moving behavior of the rotor can be fixed by the selection and arrangement of the dielectrics and can to a great extent be adapted to the requirements at hand. The motion of the rotor may be exactly controlled by the type of triggering of the electrodes, the velocity and the amplitude of the progressing field. Dependent on the velocity of the motion of the electric field, a change in the moving direction of the rotor can be obtained without changing the direction of the former. The mentioned possible modes of construction and triggering yields a multiplicity of surprising characteristic curves that describe the motion of the rotor as a function of the motion of the field. The motion of the field can be obtained technically via several phase-shifted alternating current voltages or discontinuous triggering of the electrodes. The overall micromechanical system may be made using micromechanical methods and therefore be extremely miniaturized. The required voltage for triggering corresponds in this case to those that are conventional in micromechanics, with response times in the microsecond range. The rotor may be designed in such a manner that it is completely or partially penetrable by electro-magnetic radiation or that it is mechanically deformable.

Other objects, advantages and novel features of the present invention will become apparent from the following detailed description of the invention when considered in conjunction with the accompanying drawings.

BRIEF DESCRIPTION OF THE DRAWINGS

FIG. 1b is a side view of the embodiment of FIG. 1a.

DETAILED DESCRIPTION OF THE DRAWINGS

Figure 1A:
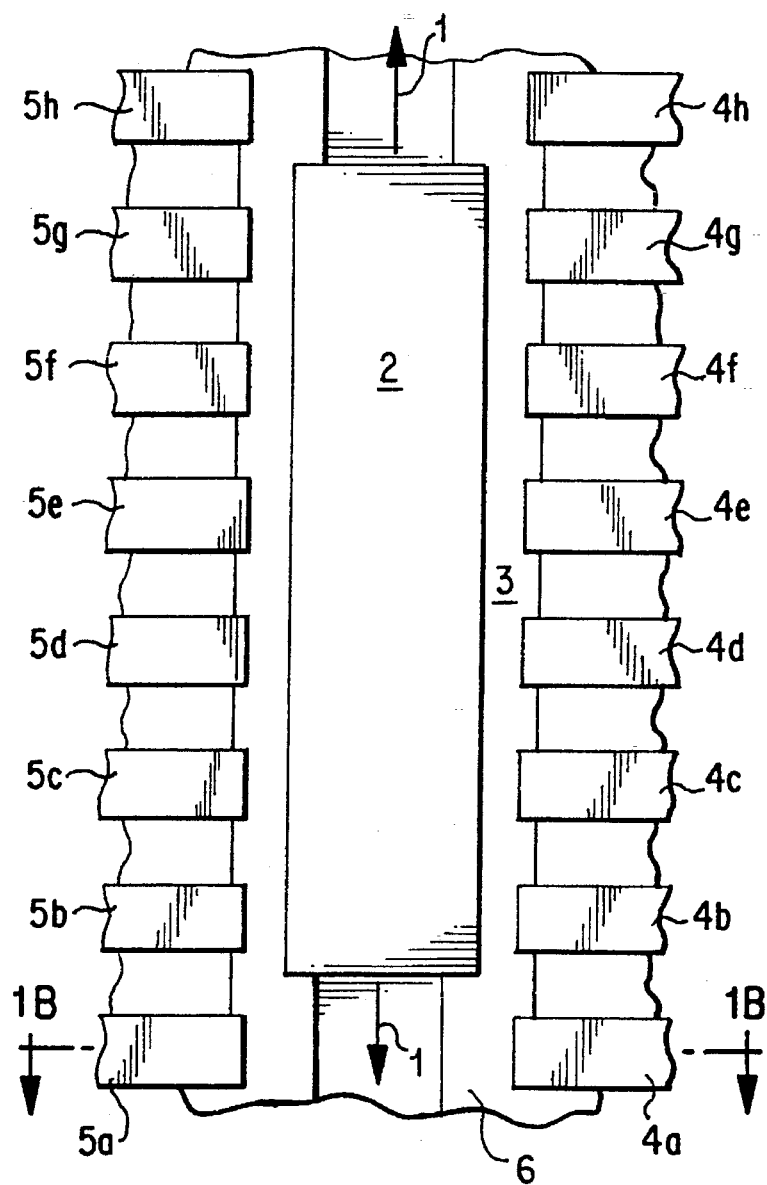
FIG. 1a is a top view of a dielectric micromechanical element constructed according to an embodiment of the present invention having electric triggering that ensues via two rows of electrodes.

The construction of the dielectric micromechanical component is illustrated in FIG. 1. It is composed of a dielectric rotor 2 which can move in the directions 1. The rotor 2 is in a guide means 7 on a ground 6 (e.g. glass). The rotor is driven via electrodes 4a–h, 5a–h, which are arranged in rows on both sides. Between the rotor 2 and the electrodes is an enveloping medium 3 (fluid or gas) contained within an enveloping space or chamber. The space can also be evacuated instead of fluid or gas filled. The running speed and direction of the rotor 2 can be changed via the dielectric construction of the rotor 2. A rotor 2 that is constructed in layers in the direction of the electrodes can move in a different direction with the moving direction of the field vector remaining the same dependent on the velocity of the motion of the field vector. Electrodes 4, 5 are triggered in pairs 5a, 4a etc., with varying polarity and in series. The overall construction can be miniaturized down to a few micrometers. The response times of the rotor 2 lie in the microsecond range.

Figure 1B:
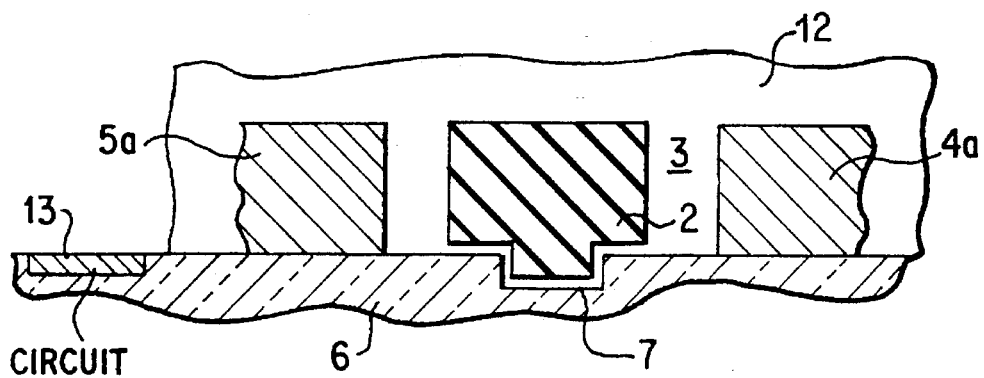
Figure 2:
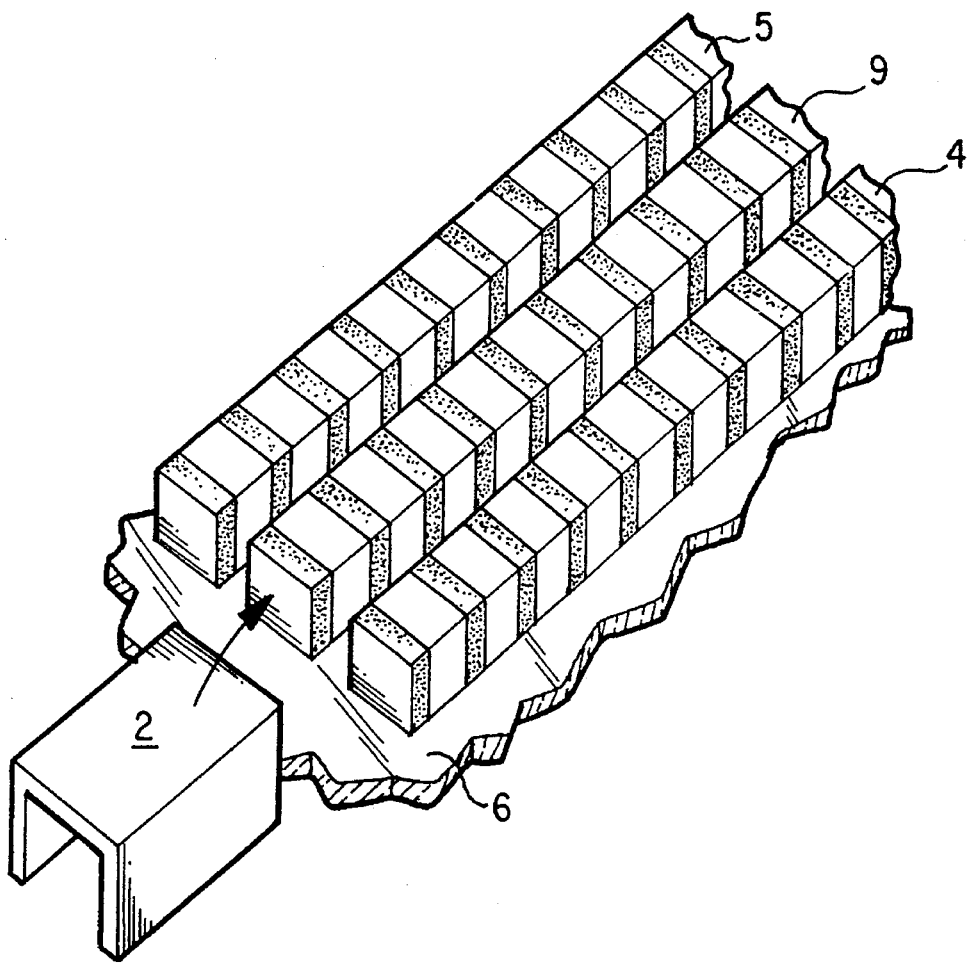
FIG. 2 is a perspective view of a dielectric micromechanical having a rotor with a center row of electrodes constructed in accordance with another embodiment of the present invention.

Another embodiment of a micromechanical element is illustrated in FIG. 2. It comprises a dielectric rotor 2 which has a U-shape. To the right and to the left are rows of electrodes 4 and 5. Within the rotor 2 in the U-shaped profile is another row of electrodes 9. The overall construction ensues on a substrate, as illustrated in FIGS. 1a and 1b. The electric triggering of the electrodes ensues as in the first embodiment with the difference that three electrodes with alternating polarity are triggered respectively. The illustrated arrangement of the electrodes increases the force acting upon the rotor 2.

The electrodes 4,5 are arranged in rows which are longer than the rotor 2. These rows can be straight, curved, branched, uninterrupted or partially interrupted, although only straight rows are shown for illustration purposes.

The dielectric components of the rotor 2 are made with methods used in semiconductor technology and in micromechanics. The rotor 2 can include several components arranged such that these components are movable in relation to one another. The rotor 2 can be composed of various dielectrics in a compartmented manner and have continuous alteration in at least one of its dielectric properties and pattern. Instead of continuous alterations, the rotor 2 can have periodic alteration in at least one of its dielectric properties and pattern. Furthermore, the rotor 2 can have conductive compartments, and partially metallic layers.

The substrate can be a semiconductor monocrystal. As the substrate, by way of illustration, silicon is used, possibly provided with thin layers of insulation such as $SiO_2$ or $Si_3N_4$ or glass.

The electrodes are structured and galvanically molded, e.g. with gold, using photolithographic methods. In this manner, the electrode pattern can be defined with micrometer precision. Electrode heights of several hundred micrometers can be obtained by employing deep-etch lithography.

Figure 3:
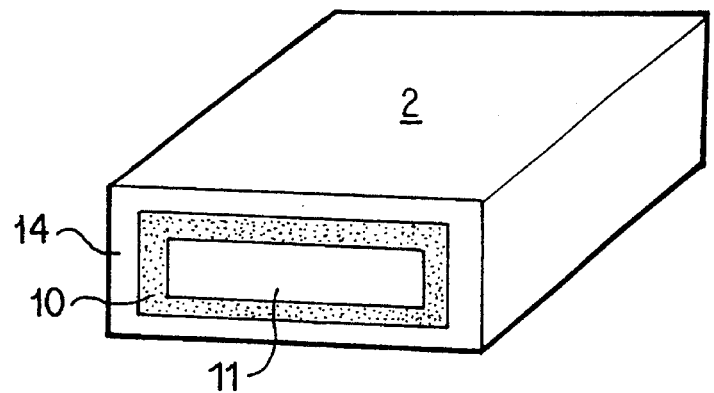
FIG. 3 is a perspective view of a rotor constructed in accordance with an embodiment of the present invention.

The rotor is also made of dielectric materials using micromechanical methods. Layers such as of $SiO_2$, $Si_3N_4$ or $TiO_2$ can be produced and structured down to thicknesses in the micrometer range. Thicker rotors can be made from photographic lacquer using deep-etch lithography. FIG. 3 shows a micromechanical element with a plurality of different dielectrics that are provided in a compartmented manner. The dielectrics are 14, 10 and 11. One of the layers, such as layer 10, can be partially a metallic layer. Furthermore, one or more of the components 14, 10 and 11 of the rotor 2 may be penetrable to optical radiation and other electromagnetic waves. Finally, one of the components 14, 10 or 11 can be conductive.

Precise grooves and channels, which serve to fix the rotor 2 or to guide to or away the enveloping solution of the micromechanical element, are etched using isotropic or anisotropic and selective etching processes. Encapsulation of the system can be achieved with a second wafer which is bonded onto the substrate wafer.

The use of silicon as a substrate material offers the particular possibility of integrating electric circuits for triggering and controlling the micromechanical element in conjunction with the mechanical components on a common substrate (wafer). An example of an integrated electric circuit 13 provided on a common substrate is illustrated in FIG. 1b.

Although the invention has been described and illustrated in detail, it is to be clearly understood that the same is by way of illustration and example, and is not to be taken by way of limitation. The spirit and scope of the present invention are to be limited only by the terms of the appended claims.

The invention thus provides a dielectric micromechanical element composed of a movable component, referred to hereinafter as a rotor, electrodes and, enveloping said rotor, a fluid-filled, gas-filled or evacuated enveloping space, hereinafter referred to as enveloping medium. The electrodes are arranged on two or more sides of the dielectrically homogeneous or inhomogeneous rotor or, arranged parallel to one another in a matrix in a surface-covering manner, with several electrodes and or electrically polarizable parts being arranged on at least one side and the electrodes being triggered via phase-shifted alternating and/or discontinuously switched voltages, and one or more field vectors being generated moving continuously or discontinuously in relation to the rotor.

Further, field vector or vectors alter their moving direction periodically or temporarily and/or posses moving directions which are independent of one another. Also, within the rotor, there can be parallel to or on the axis of motion, one or more orifices, in which one or more electrodes are arranged to which the rotor can execute a relative motion.

What is claimed is:

1. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein at least some components of said rotor are penetrable to optical radiation and other electromagnetic waves.

2. The dielectric micromechanical element of claim 1, wherein the electrodes are parallel to one another in a matrix in a surface-covering manner.

3. The dielectric micromechanical element of claim 1, wherein said field vectors have periodically altered moving directions.

4. The dielectric micromechanical element of claim 1, wherein said field vectors have independent moving directions.

5. The dielectric micromechanical element according to claim 1, wherein said rotor has conductive compartments.

6. The dielectric micromechanical element according to claim 1, wherein said rotor has partially metallic layers.

7. The dielectric micromechanical element according to claim 1, further comprising an electric circuit for triggering and controlling said micromechanical element, said electric circuit being integrated into a substrate of said chamber.

8. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein said rotor contains at least one orifice having an axis parallel to an axis of motion of the rotor, said orifice containing at least one of said electrodes to which said rotor executes a relative motion.

9. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein said rotor is composed of various dielectrics in a compartmented manner, said rotor having continuous alteration in at least one of its dielectric properties and pattern.

10. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein said rotor is composed of various dielectrics in a compartmented manner, said rotor having periodic alteration in at least one of its dielectric properties and pattern.

11. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein said electrodes are arranged in rows which are longer than said rotor, said rows being at least one of straight, curved, branched, uninterrupted and partially interrupted.

12. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein said electrodes are arranged in a matrix and said rotor is movable in a plane between said electrodes.

13. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor; and wherein the dielectric is at least one of $SiO_2$, $Si_3N_4$, $TiO_2$ and glass and said electrodes are structured and galvanically molded with photolithographic methods.

14. An asynchronous dielectric micromechanical element comprising:

a movable rotor that is at least one of dielectrically homogeneous and inhomogeneous;

a chamber that envelops said rotor and includes at least one of a fluid-filled, gas-filled and evacuated medium;

electrodes arranged on two or more sides of said rotor, with several of said electrodes being arranged on at least one side of said rotor and said electrodes being triggered via at least one of phase-shifted alternating voltages and discontinuously switched voltages, wherein field vectors are thereby generated that move at least one of continuously and discontinuously in relation to said rotor;

further comprising an electric circuit for triggering and controlling said micromechanical element, said electric circuit being integrated into a substrate of said chamber; and wherein a semiconductor mono-crystal is the substrate.

* * * * *